United States Patent [19]

Gittleman

[11] Patent Number: 4,611,835
[45] Date of Patent: Sep. 16, 1986

[54] PIPE COUPLING

[75] Inventor: Morris Gittleman, Los Angeles, Calif.

[73] Assignee: Familian Corp., Van Nuys, Calif.

[21] Appl. No.: 581,033

[22] Filed: Feb. 17, 1984

[51] Int. Cl.[4] ............................................. F16L 41/00
[52] U.S. Cl. ...................................... 285/155; 285/236;
285/373; 285/383; 285/420
[58] Field of Search ............... 285/373, 383, 236, 419,
285/DIG. 7, 137 R, 150, 345, 156, 230, 420,
231, 155, 369, 177; 403/205, 403; 77/207 A

[56]  References Cited

U.S. PATENT DOCUMENTS

| 1,801,091 | 4/1931 | Krauss | 285/155 |
| 2,302,617 | 11/1942 | Little | 285/155 X |
| 3,341,232 | 9/1967 | Deakins | 285/373 |
| 3,479,066 | 11/1969 | Gittleman | 285/373 X |
| 3,558,164 | 1/1971 | Havell | 285/236 |
| 3,565,468 | 2/1971 | Garrett | 285/373 |
| 4,189,172 | 2/1980 | Perrin | 285/236 X |

FOREIGN PATENT DOCUMENTS

| 703105 | 4/1931 | France | 285/373 |
| 2311246 | 12/1976 | France | 285/137 R |
| 444596 | 2/1968 | Switzerland | 285/373 |

Primary Examiner—Dave W. Arola
Attorney, Agent, or Firm—Evanns & Walsh

[57]  ABSTRACT

A pipe coupling for coupling the ends of pipes which may or may not have spigots at the ends and in which there may be variations in the diameters of the pipe ends and/or the spigots. A circular gasket spans the ends of the pipes being coupled. A clamping device clamps around the gasket and against the pipe ends. The gasket has a smooth, uninterrupted, intermediate exterior portion. A space or cavity is provided between this portion of the gasket and the inside of the clamping device. One or more external ribs are provided on the outside of the gasket between the intermediate portion and each end. These ribs are enlarged or enhanced in height or depth to provide the cavity between the intermediate part of the gasket and the inside of the clamping device. A spigot on the end of one pipe or both will force the intermediate part of the gasket into the cavity which provides space to accommodate the presence of spigots and variations in diameter.

9 Claims, 13 Drawing Figures

U.S. Patent  Sep. 16, 1986  Sheet 1 of 4  4,611,835
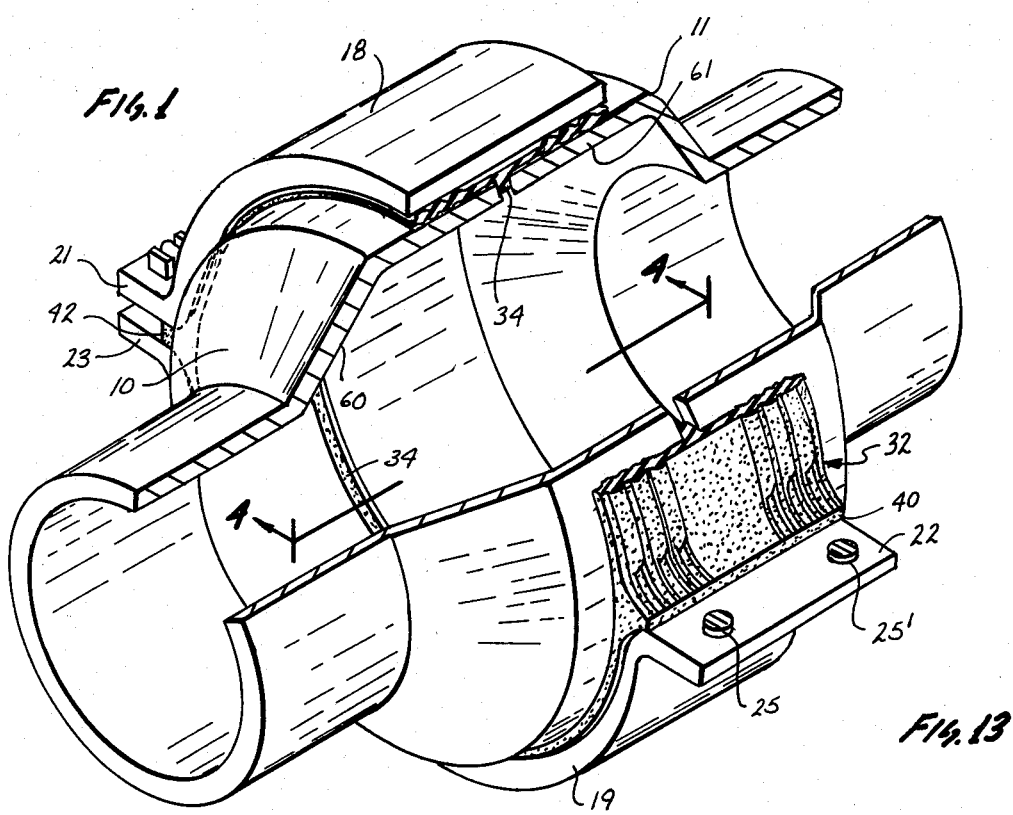
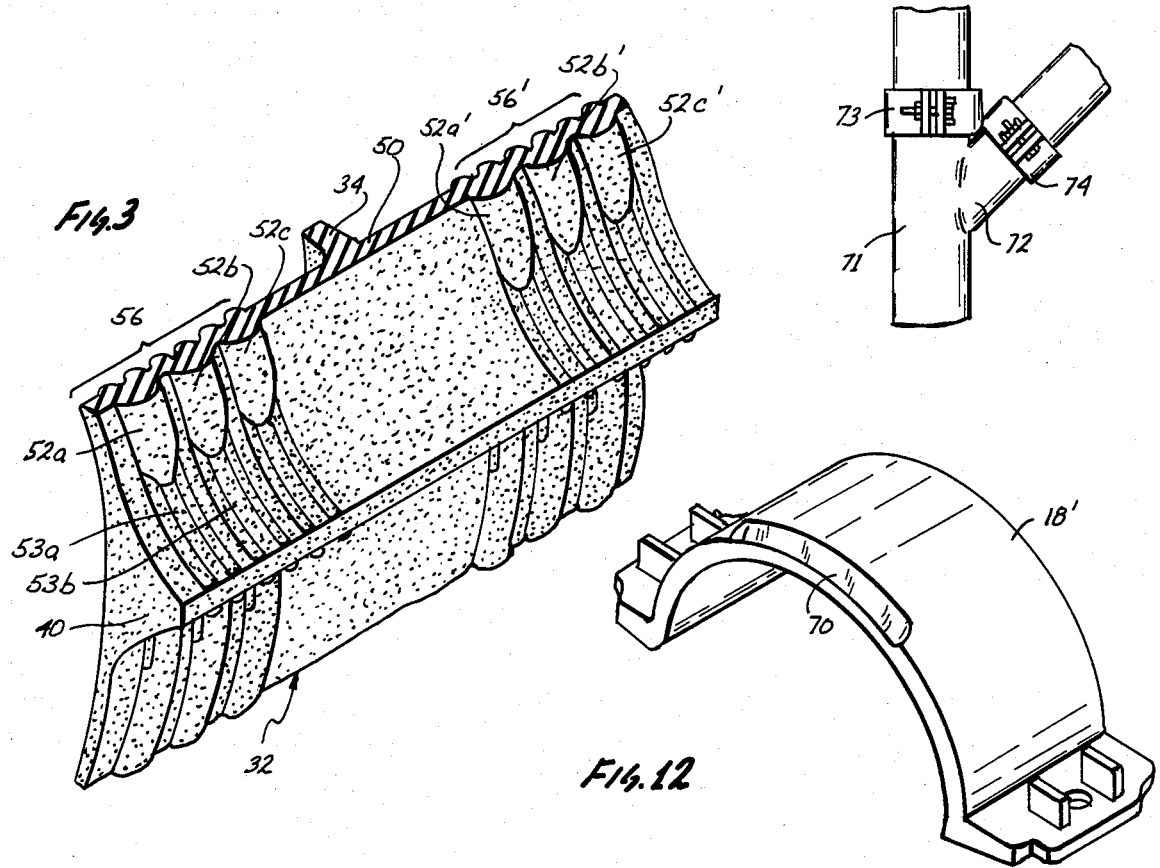

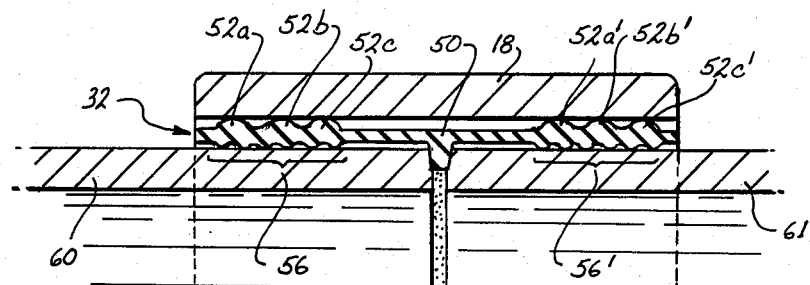
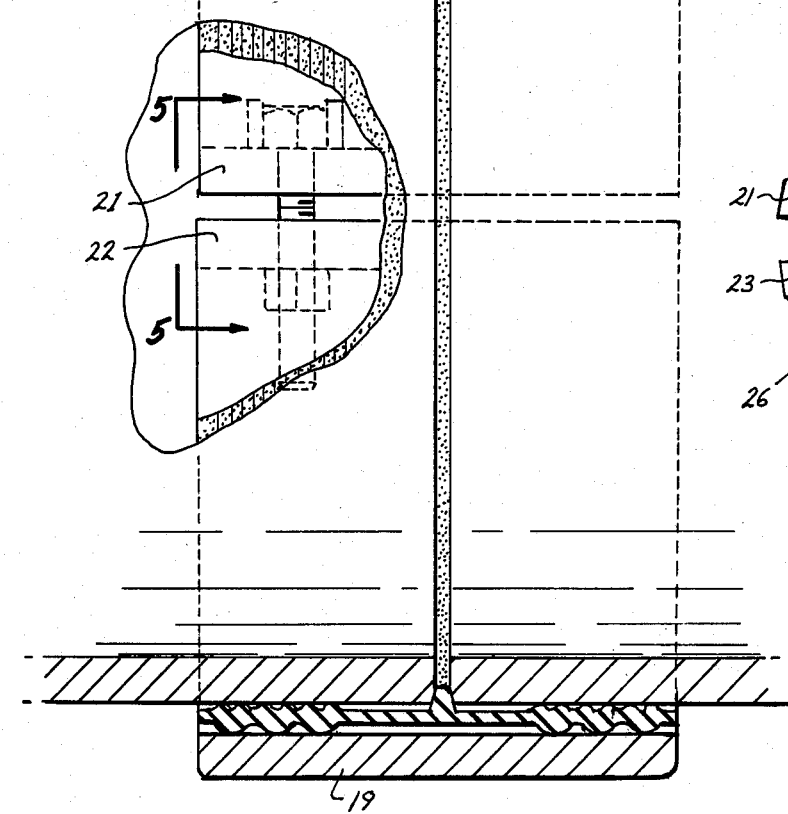
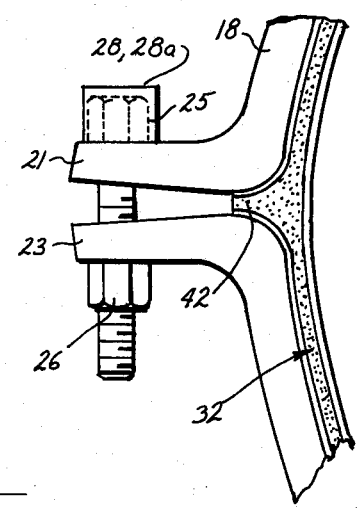
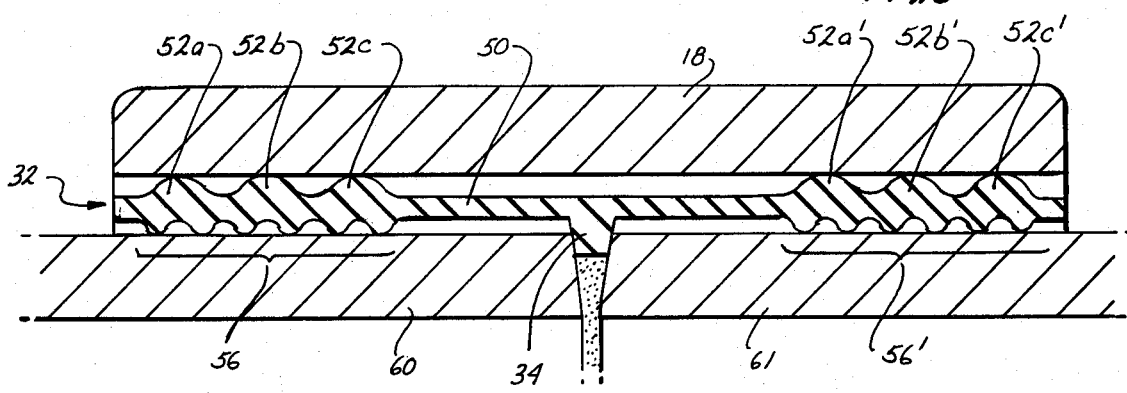

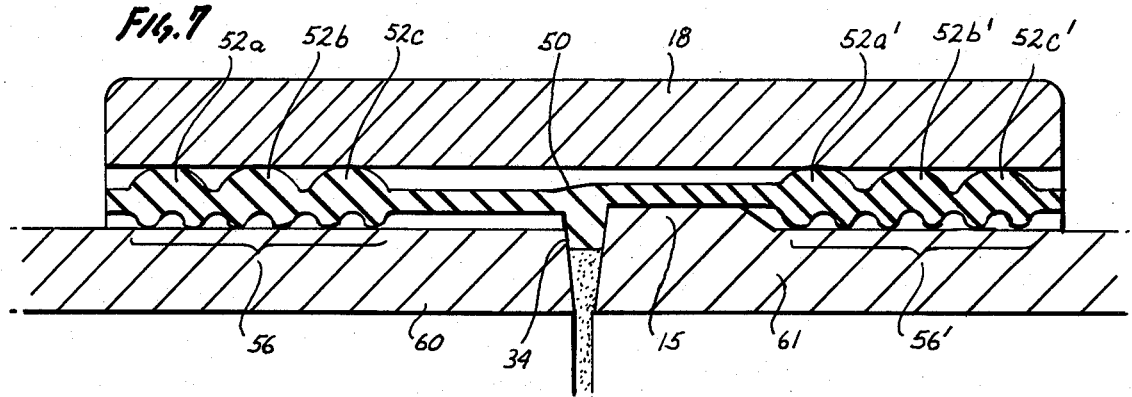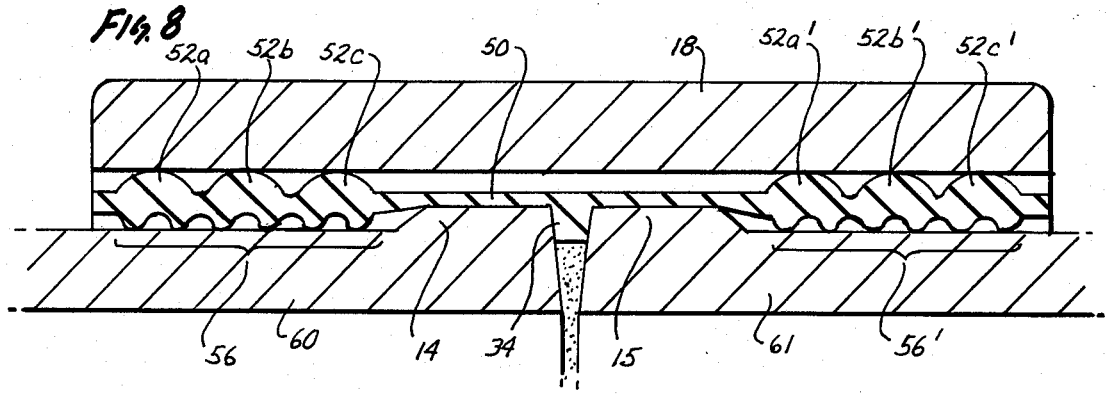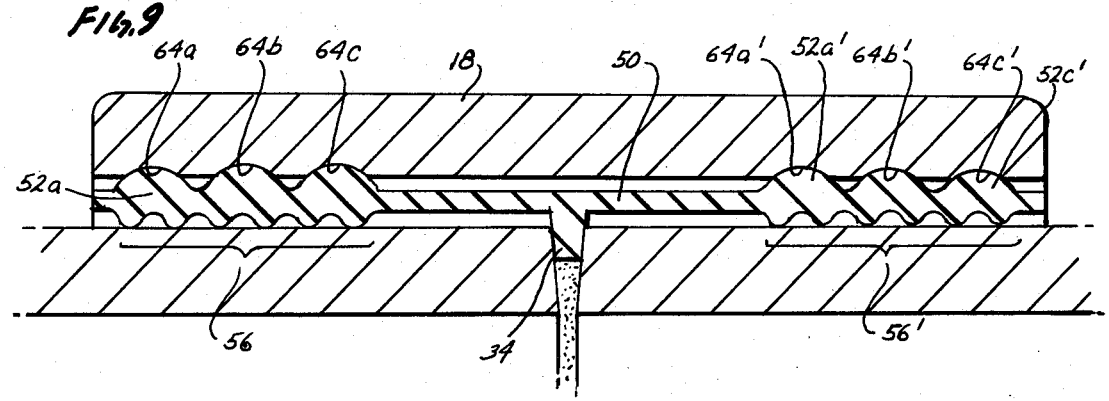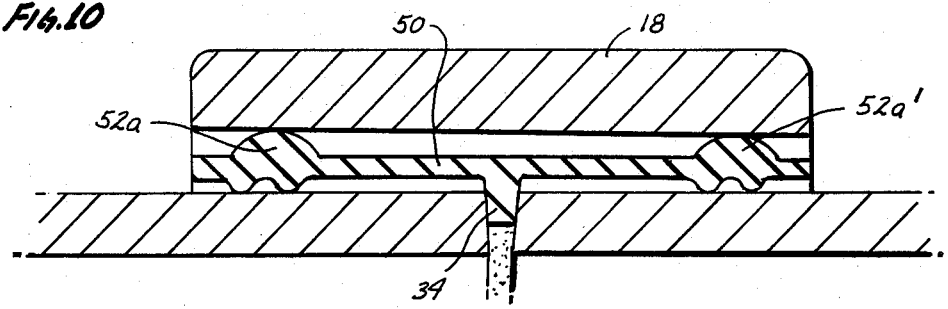

PIPE COUPLING

BACKGROUND OF THE INVENTION

1. Field of the Invention

The field of the invention is that of pipe couplings. The invention is particularly adapted for coupling soil pipes but is not limited thereto. For example, plastic pipe, as well as clay, can readily be joined by the coupling.

2. Description of the Prior Art

The invention is primarily an improvement over U.S. Pat. No. 3,479,066 and all prior art cited therein. U.S. Pat. No. 4,417,755 is also an improvement over U.S. Pat. No. 3,479,066, the coupling of U.S. No. 4,417,755 utilizing clamping members made of plastic.

The coupling of U.S. Pat. No. 3,479,066 has been very successful commercially, possessing all of the capabilities that have been attributed to it. However, there have been discovered certain improvements which provide for advantages and capabilities that go beyond the prior art and which are identified hereinafter.

SUMMARY AND OBJECTS OF THE INVENTION

The coupling of the invention is basically similar to that of U.S. Pat. No. 3,479,066 which is hereby incorporated by reference. The coupling of the herein invention is one adapted for utilization for coupling pipe ends as described in the previous patent, that is, it is adapted for coupling the ends of pipes that either have or do not have external annular end ribs, known as spigots. Further, it is known that pipe ends that are nominally of the same size may embody variations in external diameter which must be compensated for, and the same is true with respect to spigots which may be present at the ends of the pipes.

In U.S. Pat. No. 3,479,066, a coupling is provided by way of a gasket which is circular, that is, in a position spanning the ends of the pipes to be coupled. The gasket is surrounded by a pair of clamps having radially extending ears, the ears on opposite sides being secured together by bolts which can be torques to desired holding force. In the coupling of the said prior patent, there was provided on the outside of the gasket a relatively wide band or rib, and on the inside of the clamps, there was provided a recess which received the relatively wide band on the outside of the gasket. With a spigot on the end of either one of the pipes to be coupled or on the end of both of the pipes, the intermediate part of the gasket having the rib would be forced up into the recess in the clamping members.

U.S. Pat. No. 4,417,755 provided improvements in the coupling of U.S. Pat. No. 3,479,066, particularly in that the clamping members were made of plastic but with further improvements including the contour of the diametrically opposed, extending ears on the gasket. The clamping members in this patent included strengthening ribs which extend all the way to the end of the lugs or flanges at the ends of the clamping members.

Having reference to the herein invention, it was discovered and the concept was originated providing for a cavity or space within the coupling in between the intermediate part of the gasket and the inside of the coupling member, the inside of the coupling member having a smooth, uninterrupted inner surface rather than having a circumferential recess in it. The presence and existence of this cavity within the coupling is assured by way of absence of an intermediate external rib on the gasket and by external ribs on the outside of the gasket on each side of the intermediate portion, these ribs being enhanced, that is, having a relatively greater radial dimension and having internal ribs on the inside of the gasket opposite the larger or enhanced external ribs. This arrangement includes external ribs on the contoured outer surface of the contoured ears on opposite sides of the gasket. Thus, this combination assures the presence of a cavity in the coupling between the intermediate part of the gasket and the inside surface of the clamping members which is a smooth surface, the coupling having a dynamic characteristic in that the radial dimension of the cavity varies depending upon the original height of the enchanced external ribs and the amount of clamping pressure that is applied so that even within large variations and tolerance, that is, radial dimensions, of pipe ends and whether or not one or more spigots is present, accommodation as provided for these variances while still having full sealing capability. Preferably, a pair of internal sealing ribs is provided on the inside of the gasket opposite each individual enhanced outer rib which provides pressure for causing the internal ribs to seal. As can be observed, if a larger cavity or space between the intermediate part of the gasket and the inside of the clamp is needed, this can be achieved by increasing the height or enhancement of the outer ribs so as to assure that it has a proper dimension, that is, depth, to accommodate spigots and/or variations in the outside diameter of pipe ends.

In the light of the foregoing and of the earlier patents which are incorporated by reference, it is a primary object of the invention to provide a pipe coupling, as described, having improved capabilities with respect to sealing and, particularly, with respect to accommodating for variations in tolerances, that is, in the diameters of pipe ends to be coupled or in the diameters of spigots which may be present at the ends of the pipes. The coupling is adapted for coupling the ends of pipes without spigots; or with one pipe end which has a spigot and one which does not; or pipe ends wherein both ends have spigots.

A particular object is to realize a coupling construction embodying clamping means and a circular gasket which spans the pipe ends inside of the clamping means wherein provision is made for there being a space or cavity between the intermediate part of the gasket and the inside surface of the clamping means. An auxiliary object is to provide for constructional means for exercising control of the size of the said space or cavity to insure that accommodation is provided for variation in diameters of pipe ends and/or presence of spigots or variations in their diameter.

A further object is to realize a construction as in the foregoing wherein the gasket is provided with at least one external rib on each end of the gasket between the intermediate portion and the end of the gasket, these ribs being of relatively increased radial dimension of an amount to insure the provision of the space or cavity between the outside of the intermediate part of the gasket and the inside of the clamping means whereby the radial dimension of the space or cavity is sufficient to insure the capability of the gasket accommodating to the variations in diameter of pipe ends and/or spigots.

A further object is to realize a construction as in the foregoing wherein a gasket is provided with internal sealing ribs which are positioned opposite to the external ribs and, particularly, that one or more internal ribs is provided opposite to each of the external ribs.

It is a further object to provide a construction as referred to in the foregoing which is included in a combination wherein the gasket is circular and has diametrically opposed outwardly extending ears, there being semi-circular clamps with extending flanges or lugs which clamp the extending ears between them, the sealing being enhanced by way of the ribs as referred to in the foregoing and further by way of ribs being provided on the outside of the extending ears, the ribs on the ears extending from the ends of the external ribs on the outside of the gasket.

Further objects and additional advantages will become apparent from the following detailed description and annexed drawings.

BRIEF DESCRIPTION OF THE DRAWINGS

FIG. 1 is an isometric view partially cut away of a preferred form of the invention;

FIG. 3 is a partial sectional isometric view which is a detail of one of the ears on the gasket;

FIG. 4 is a sectional view of the coupling taken along the line 4—4 of FIG. 1;

FIG. 5 is a detail view taken along the line 5—5 of FIG. 4;

FIG. 6 is an enlarged sectional view of the clamping means like the sectional view of FIG. 4;

FIG. 7 is a cross-sectional view similar to that of FIG. 6 but showing the coupling joining the ends of pipes wherein only one pipe has a spigot at the end;

FIG. 8 is a sectional view similar to that of FIGS. 6 and 7 but illustrating the coupling joining pipes wherein both pipes have end spigots;

FIG. 9 is a sectional view which is similar to that of FIG. 6 but showing a modified form of the invention wherein the inside of the clamping members have shallow grooves to receive the enhanced ribs at both ends of the gasket;

FIG. 10 is a sectional view similar to that of FIG. 6 but showing a modified form of the invention wherein there is only one external rib on each end of the gasket between the intermediate part of the gasket and the end thereof;

FIG. 12 is a detail isometric view of a clamp having a cut-out of bevel to facilitate installation adjacent other clamps; and FIG. 13 is a schematic view illustration utilization of the detail of FIG. 2.

DESCRIPTION OF A PREFERRED FORM OF THE INVENTION AND BEST MODE OF PRACTICE

Reference is made particularly to FIGS. 1, 2, 4 and 5 of the drawings. Referring to FIG. 1 of the drawings, one form of the pipe coupling of the invention is shown in this figure. Numerals 10 and 11 designate ends of pipe or conduit sections which in this instance are enlarged or belled at the ends.

The pipe sections as shown are of the type that do not have spigots at the ends, that is, annular end ribs as shown at 14 and 15 in FIG. 8. The pipe coupling of the invention is such that it is capable of providing a rigid, effective seal, whether the end ribs or spigots are present or not, and it is capable of accommodating to variations in tolerances, that is, diameters of pipe ends.

Figure 2:
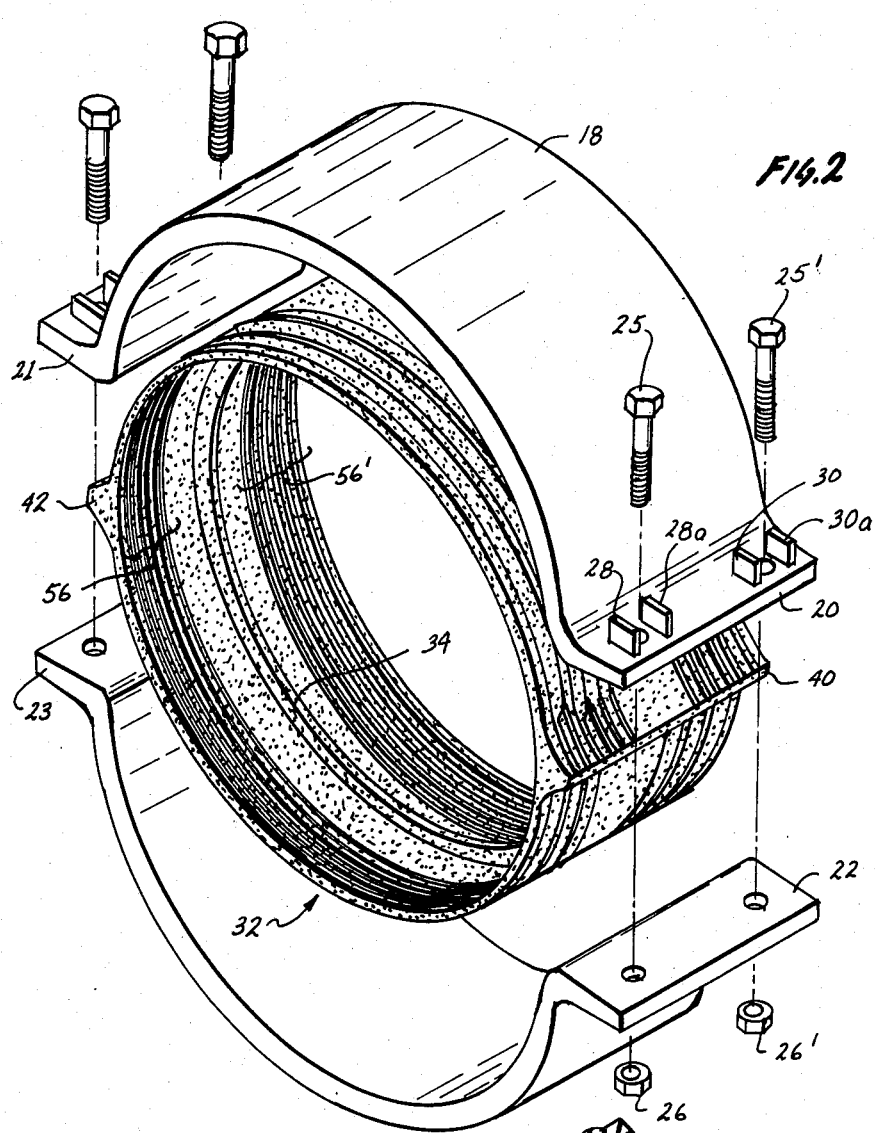
FIG. 2 is an exploded isometric view of the coupling of FIG. 1.

The coupling comprises semi-circular clamping members 18 and 19 which have generally radial but diverging flanges or lugs for clamping purposes. Member 18 has extending flanges or lugs 20 and 21, and the clamping member 19 has extending flanges or lugs 22 and 23, as may be seen in FIGS. 1 and 2. The flanges have openings as shown, and they are secured together. As illustrated in FIG. 2, the flanges or lugs 20 or 22 can be secured together by bolts 25 and 25' which extend through the lugs, and numerals 26 and 26' designate the nuts for the bolts. The heads of the bolts are hexagonal, and adjacent the bolt holes in flange 20 are flat upright members 28 and 28a, and 30 and 30a, which engage sides of the heads of the bolts 25 and 25' to restrain them against rotation. The clamping bolts for flanges 21 and 23 are the same as those just described and are held from rotation in the same manner so that the description need not be repeated.

Numeral 32 designates a circular gasket member which may be made of any suitable, flexible sealing material, such as noeprene. The gasket is relatively thin in section. It has an integral, internal intermediate rib 34.

The gasket 32 has diametrically opposed extending external ears as identified at 40 and 42. See, particularly, FIGS. 2 and 5. The external surface of each of the ears forms a fillet having a curvature conforming to complementary surfaces of the clamping means. As may be seen in FIG. 3, the exterior surface of the ear 40, and similarly the ear 42, as shown in FIG. 5, is concavely curved and mates with the complementary surface inside of the clamp. The complementary surface for the clamp 18 is shown at 40 in FIG. 5 which is in engagement with an exterior surface of the ear 42.

FIG. 5 is an enlarged view which shows the clamping flanges or lugs 21 and 23 held together by bolts, as previously described. Preferably, the clamping flanges or lugs are tapered slightly away from each other which may be in a amount as illustrated generally in FIG. 5. The purpose of the tapering is to insure that the ears will always be held in a position separating the clamping lugs so that they do not come together. This feature is particularly useful in connection with smaller sizes of coupling units which may range in size from one and one-half inches in diameter to ten inches or more.

The gasket 32 has external ribs and also internal ribs, as may be seen in FIGS. 2 and 4. As seen in FIGS. 1 through 4, the gasket has an intermediate portion 50 providing a smooth, uninterrupted surface. At opposite ends between this surface and each end of the gasket is a group of three external ribs. These ribs in FIGS. 3 and 4 are identified by the characters 52a, 52b and 52c adjacent one end, and the characters 52a', 52b' and 52c' adjacent the opposite end of the gasket. The groups of three external ribs at each end of the gasket are appropriate for the larger sizes of couplings, such as the ten-inch size. For smaller sizes, as will be explained hereafter, different numbers of external ribs may be used, such as one, two or even more than three, can be used in large sizes if desired.

Directly opposite each of the external ribs, as described, are internal ribs. These ribs may be seen in the cross-sectional view, FIG. 4, and in this figure, numeral 56 identifies a group of six internal ribs opposite the external ribs at one end, and numeral 56' identifies a group of six internal ribs at the other end of the gasket.

As shown, there are two internal ribs which are opposite from external rib 52a; there are two internal ribs opposite the external rib 52b; and there are two internal ribs opposite the external rib 52c. The configuration or confirmation is the same at the other end of the gasket. It is significant that the external ribs have greater height, that is, radially extent, than the internal ribs, this having a very significant purpose. FIGS. 1 and 4 illustrate the coupling in assembled condition but with very limited torquing of the bolts to draw the mating clamping flanges or lugs towards each other. It is to be observed that a cavity or space is provided or formed between the intermediate part of the gasket, as shown at 50, and the inside of the clamping members. This space provides for, and accommodates, the forcing outwardly of the intermediate part of the gasket which can accommodate situations where there is a spigot at the end of only one of the pipes; or the situation where there are spigots on the ends of both of the pipes being coupled; or there is no spigot on either of the pipe ends. These relationships are shown in FIGS. 6, 7, and 8 and will be referred to more in detail presently.

The outer ribs on the gasket are provided to have a height or radial extent so that there is provided a space or cavity above the intermediate part 50 of the gasket which is large enough to accommodate the extent to which the intermediate part of the gasket may be forced out so that in this manner, the coupling has the capability of compensating for, or accommodating, the different types of pipe ends, that is, with reference to spigots, or pipe ends in which there may be variations in tolerances, that is, external diameters. The compression depth in the intermediate area is limited by the height (diameter) of the spigot or spigots. Even if that should occur, gasket seal has already been inevitably established by seal compression.

As pointed out, there are two internal ribs opposite each of the larger or higher external ribs. When the clamping force (torque) is applied, the external ribs tend to compress, and pressure is exerted directly against the internal ribs which effect the sealing against the pipe ends which is very effective due to this relationship of ribs. Normally, it is expected that with respect to the radial dimension of the external ribs, they will compress to the extent of approximately, or by way of example, an amount which is approximately up to one-third of their radial dimension. This provides for a proper and adequate space or cavity above gasket part 50 on the outside of the intermediate part of the gasket so that even when a fully clamped, that is, with the clamping bolts torqued to 175 pounds per square inch by way of example, some space 50 still remains between the outside of the intermediate part of the gasket and the interior of the clamping members. By way of example, but without limitation, this space above the gasket part 50 between the intermediate part of the gasket and the inside of the clamp might be 3/16ths of an inch so that in the unclamped condition, this would represent the height or vertical dimension of the larger outer ribs. In the torqued condition, it is pointed out that the outer ribs will apply pressure to the inner sealing ribs and the outer ribs will tend to compress accordingly, but a space will still be left above the intermediate part of the gasket.

Referring again to FIG. 3 of the drawings, it is to be noted that the ear 40, as shown, itself has ribs on the outside contour of its surface, Then for each of the external ribs on the gasket, there are two, that is, a pair, of external ribs on the ear 40. Thus, by way of example, for the rib 52a there are two ribs as designated at 53a and 53b slightly spaced apart, extending from the end of external rib 52a to the outside end of the ear 40. For each of the external ribs, there are a pair of ribs on the outside of the ear, and since they are all alike, a repetition of the description is not necessary.

There is cooperation as between the ribs on the outside of the ears as described, the enlarged external ribs which are identified by the numeral 52 and cavity 50. Since the larger ribs as identified at 52 and the gasket itself are between the pipe ends and the inside of the clamping members, placing of the ribs on the external surfaces of the ears 40 and 42 compensates for, or cooperates with this, that is, the external ribs on the gasket in preserving the cavity or space between the outside of the intermediate part of the gasket and the inside of the clamping members. It will be understood that the external ribs can be radially dimensioned so as to provide for a cavity or space as described of an appropriate amount so that the coupling has the capability of accommodating to a substantial range of variation in tolerances, that is, in dimensions of pipe ends and/or spigots at the ends of pipes. It can be seen that the structure has this dynamic characteristic which is exemplified by the compression of the outer rings and the pressure exerted on the inner rings for sealing, and at the same time the vectorial forces exerted by the contoured end parts of the clamping members against the contoured, filleted and ribbed outer surfaces of the ears which cooperate to provide sealing by vectorial forces in the ear areas.

It will be noted that in all configurations, the center internal rib 34 fits in between the ends of the pipes.

As will be observed in FIG. 6, there is a space or a cavity in between the intermediate part 50 of the gasket and the inner surface of the coupling member 18.

As will be observed in FIG. 7, the spigot 15 at the end of pipe 61 causes the intermediate part 50 of the gasket to be deformed upwardly, but nevertheless, there still remains a cavity or space between this part of the gasket and the inside surface of the coupling 18. This space remains also in an arrangement wherein spigots 14 and 15 are provided at the ends of pipe 60 and 61 as shown in FIG. 8. The entire intermediate part of the gasket deforms upwardly into the space as shown, but typically, some space or cavity still remains between the intermediate part of the gasket and the inside of the clamping member. FIGS. 6, 7 and 8 illustrate the dynamic characteristic of the coupling. As previously explained, the height of the outer ribs identified by the character 52 is sufficient so that in the situations shown in FIGS. 6, 7 and 8, there is always provided room for the intermediate part of the gasket to deform, the sealing against the pipe ends being by way of the inner ribs having pressure exerted against them by the outer ribs, the inner ribs being identified by the character 56. Along with this action of the intermediate part of the gasket and the operation of the cooperating ribs, the external ribs as previously described on the outside of the contoured surfaces of the ears 40 and 42 cooperate with the contoured internal surfaces of the clamps, such as identified at 40, so that the necessary vectorial forces are provided so that the seal is fully effective in the area of the ears as well.

FIG. 9 shows a modified form of the invention, the modification being a cross-section. In the structure of this figure, it is the same as that already described with the following exception. For each of the external ribs on the gasket, there is provided a complementary, relatively shallow groove on the inside of the coupling member into which the rib extends. These relatively shallow grooves are identified by the characters 64a, 64b and 64c at one end of the gasket and characters 64a', 64b' and 64c' at the other end of the gasket. By way of example, these grooves might have a depth which might be one-third or less of the total height or radius dimension of the larger enhanced ribs. These grooves in the modified form of the invention may be used in the clamping members for the purpose of insuring against axial movement of the clamping members relative to the gasket itself. The construction and operation is otherwise like that already described.

FIG. 10 shows a modified form of the invention which is like the forms already described except that this modification is primarily for smaller size coupling units, such as one and one-half, two-inch and three-inch or four-inch units. The difference is that only a single enhanced rib is utilized at each end of the gasket spaced from the intermediate portion 50. Two ribs are identified by the characters 52a and 52a' which are like corresponding ribs shown in FIG. 4. As described in connection with previous modifications, there are two ribs on the inside of the gasket opposite each of the outer ribs 52a and 52a'.

Figure 11:
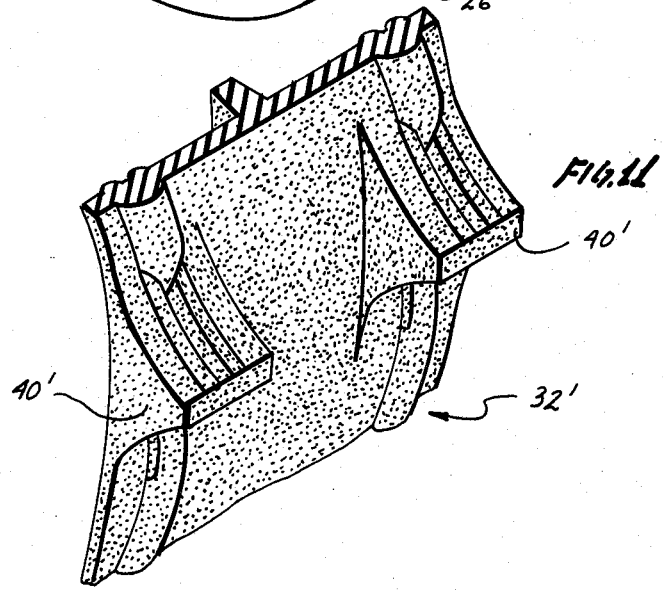
FIG. 11 is an isometric sectional view similar to that of FIG. 3 but showing a modified form of gasket and gasket ear.

FIG. 11 is a detail partial isometric view of a modified form of the gasket. This form of the invention is like that of FIG. 3, referring to the gasket, except that there is only one external rib on each end of the gasket between the intermediate part of the gasket and the end, and instead of there being two ears as previously identified at 40 and 42 instead on each side of the gasket, there are two spaced ears as shown at 40' and 40" in FIG. 11, with an open space between them. The advantage of this arrangement is in that there is a saving of rubber by reason of the omission of a part of the ear between the ear parts identified at 40' and 40". Additionally in FIG. 11, as will be noted, for each of the two enlarged or enhanced external ribs on the gasket, there is a single pair of ribs on the contoured surfaces of the ears or ear parts 40' and 40". This form of a gasket is otherwise like that of FIG. 3 and therefore need not be described further in detail.

As described in connection with previous embodiments, there are two smaller ribs directly opposite the enhanced ribs 52a and 52a' which operate in a manner already described.

From the foregoing, those skilled in the art will readily understand and appreciate the nature of the invention and the manner in which its objects as set forth in the foregoing are realized. The foregoing description fully identifies the manner in which each of the superior capabilities is realized.

FIG. 12 is an isometric view of a clamping member which is like that shown in FIG. 2 with a slight modification. The modification is an indentation cut-out or bevel as identified at 70 in FIG. 12. This indentation or cut-out is useful in a situation wherein two couplings are so close together that an edge part of a clamp of one coupling would interfere with an edge part of another clamp as illustrated in FIG. 13. FIG. 13 shows two pipes, 71 and 72, at an angle. In these pipes are clamping members 73 and 74, character 75 illustrating a third clamp. As can be seen, the clamps 73 and 74 are at an angle to each other and are close enough together that edges of a clamp of each of the couplings would interfere with each other. Thus, to avoid such interference and to allow the clamps to be as close to each other as desired, indentations or cut-outs as identified at 70 in FIG. 12 are provided in the adjacent clamps whereby the interference is avoided. Thus, the installation of the clamps in the manner shown in FIG. 3 and in other similar installations is accommodated for.

The foregoing disclosure is representative of preferred forms of the invention and is to be interpreted in an illustrative rather than a limiting sense, the invention to be accorded the full scope of the claims appended hereto.

What is claimed is:

1. A pipe coupling for coupling the ends of pipes or conduits in fluid-tight relationship and adapted for pipes either with or without external annular end ribs comprising, in combination, clamping means configurated for clamping around the pipe ends, the said clamping means being rigid and generally circular, circular axially and circumferentially continuous gasket means interposed between the clamping means and pipe ends being coupled and spanning the ends of the pipes, said gasket means having an axial length substantially equal to the axial length of said clamping means, the improvements comprising the said clamping means over its entire axial length having smooth, uninterrupted inner surfaces, being of uniform internal diameter said gasket means having a smooth, uninterrupted intermediate outer surface portion, said gasket means having at least one external rib between the said intermediate portion and each end of the gasket and having internal ribs opposite each external rib, said external ribs having sufficient radial dimension so as to normally provide a space between the intermediate portion of the gasket and the inside surfaces of the clamping means whereby to accommodate pipe ends having different diameters and/or pipe ends having spigots by allowing movement of the intermediate portion of the gasket means into said space during compression of the gasket.

2. A pipe coupling as in claim 1 wherein the outer ribs have greater radial dimension than the inner ribs.

3. A pipe coupling as in claim 2 wherein each outer rib is in a position opposite to a plurality of inner ribs on the inside of the gasket.

4. A pipe coupling as in claim 1 wherein the said gasket means has diametrically opposed, outwardly extending, axially elongated ears, the said clamping means having clamping lugs, with said ears clamped therebetween.

5. A pipe coupling as in claim 4 wherein the said ears are concavely curved and thickened at their inner portions, the said lugs having complementary contoured portions whereby compression of said ears by said lugs exerts a radially inward force on said gasket means, the said lugs being held spaced apart by said ears.

6. A pipe coupling for coupling the ends of pipes or conduits in fluid-tight relationship and adapted for pipes either with or without external annular end ribs comprising, in combination, clamping means configurated for clamping around the pipe ends, the said clamping means being rigid and generally circular, circular axially and circumferentially continuous gasket means interposed between the clamping means and pipe ends being coupled and spanning the ends of the pipes, said gasket means having an axial length substantially equal to the axial length of said clamping means, the improvements comprising the said clamping means having smooth, uninterrupted intermediate inner surfaces, said gasket means having a smooth, uninterrupted intermediate outer surface portion, said gasket means having at least one external rib between the said intermediate portion and each end of the gasket and having internal ribs opposite the external ribs, said external ribs having sufficient radial dimension so as to normally provide a space between the intermediate portion of the gasket and the inside surfaces of the clamping means whereby to accommodate pipe ends having different diameters and/or pipe ends having spigots by allowing movement of the intermediate portion of the gasket means into said space during compression of the gasket, the said gasket means having diametrically opposed, outwardly extending, axially elongated ears, the said clamping means having clamping lugs with said ears clamped therebetween, said clamping means including generally semicircular clamping members having said lugs extending from the clamping members, said ears being concavely curved and thickened at their inner portions, the said lugs having complementary contoured portions whereby compression of said ears by said lugs exerts a radially inward force on said gasket means, the said lugs being held spaced apart by said ears, the said ears having ribs on the outside thereof conforming with the contour of the ears, the said ribs being located opposite the inner ribs to provide direct vector forces against inner seal ribs for sealing in ear areas.

7. A pipe coupling as in claim 6 wherein said ribs on said ears extend from the said external ribs on the gasket to the outer ends of the ears.

8. A pipe coupling for coupling the ends of pipes or conduits in fluid-tight relationship and adapted for pipes either with or without external annular end ribs comprising, in combination, clamping means configurated for clamping around the pipe ends, the said clamping means being rigid and generally circular, circular axially and circumferentially continuous gasket means interposed between the clamping means and pipe ends being coupled and spanning the ends of the pipes, said gasket means having an axial length substantially equal to the axial length of said clamping means, the improvements comprising said gasket means having external rib means including at least one external rib and the gasket having internal ribs engageable with the pipe ends, said clamping means having at least one internal groove to receive a part of the gasket, the said gasket rib means and the clamping means being constructed so as to normally provide a space between the intermediate portion of the gasket and the inside surfaces of the clamping means whereby to accommodate pipe ends having different diameters and/or pipe ends having spigots by allowing movement of the intermediate portion of the gasket means into said space, the said gasket means having diametrically opposed, outwardly extending, axially elongated ears, the said clamping means having clamping lugs with said ears clamped therebetween, the said ears being concavely curved and thickened at their inner portions, the said lugs having complementary contoured portions whereby compression of said ears by said lugs exerts a radially inward force on said gasket means, the said lugs being held spaced apart by said ears, the said ears having ribs on the outside thereof conforming with the contour of the ears.

9. A pipe coupling for coupling the ends of pipes or conduits in fluid-tight relationship and adapted for pipes either with or without external annular end ribs comprising, in combination, clamping means configurated for clamping around the pipe ends, the said clamping means being rigid and generally circular, circular axially and circumferentially continuous gasket means interposed between the clamping means and pipe ends being coupled and spanning the ends of the pipes, said gasket means having an axial length substantially equal to the axial length of said clamping means, the improvements comprising the said clamping means having smooth, uninterrupted intermediate inner surfaces, said gasket means having a smooth, uninterrupted intermediate outer surface portion, said gasket means having at least one external rib between the said intermediate portion and each end of the gasket and having internal ribs opposite the external ribs, said external ribs having sufficient radial dimension so as to normally provide a space between the intermediate portion of the gasket and the inside surfaces of the clamping means whereby to accommodate pipe ends having different diameters and/or pipe ends having spigots by allowing movement of the intermediate portion of the gasket means into said space during compression of the gasket, said clamping means including a pair of generally semi-cylindrical clamping means, at least one of said clamping means having a beveled cut-out portion at one side edge thereof to accommodate and facilitate couplings being installed closer to each other in a Y connection where at least one pipe branches off from another.

* * * * *